Aug. 27, 1957                J. ST. G. MITCHELL ET AL                2,804,091
              APPARATUS FOR INJECTING LIQUIDS INTO LIQUID LINES
Filed May 10, 1954                                          2 Sheets-Sheet 1

INVENTORS
JAMES ST. GEORGE MITCHELL
GEORGE FREDERICK CROFTON
BY
*Fetherstonhaugh & Co.*
ATTORNEYS Aug. 27, 1957  J. ST. G. MITCHELL ET AL  2,804,091
APPARATUS FOR INJECTING LIQUIDS INTO LIQUID LINES
Filed May 10, 1954  2 Sheets-Sheet 2

INVENTORS
JAMES ST. GEORGE MITCHELL
GEORGE FREDERICK CROFTON
BY
Fetherstonhaugh & Co
ATTORNEYS

United States Patent Office 2,804,091
Patented Aug. 27, 1957

2,804,091

APPARATUS FOR INJECTING LIQUIDS INTO LIQUID LINES

James St. George Mitchell, North Vancouver, British Columbia, and George Frederick Crofton, Vancouver, British Columbia, Canada, assignors to Clorex Chemicals Ltd., Vancouver, British Columbia, Canada, a corporation of British Columbia Application May 10, 1954, Serial No. 428,607

2 Claims. (Cl. 137—566)

This invention relates to apparatus for injecting liquids into liquid-containing lines for any desired purpose.

The main object of this invention is the provision of apparatus for treating water for domestic or other uses, although it may be used for many other purposes, such as for adding one chemical to another in desired proportions. The apparatus is primarily designed for injecting a chlorine solution, such as sodium hypochlorite or chlorine water, into water systems, but other liquids may be used, such as solutions for softening or conditioning various kinds of water, or for the fluorination thereof.

The apparatus according to this invention includes an injector to be connected in a liquid line, said injector having a primary or liquid passage extending therethrough from an inlet to an outlet, a restriction in the passage spaced from the ends thereof, and a secondary passage in the injector communicating with the primary liquid passage at the restriction on the outlet side thereof. This injector is used in combination with a container for a liquid having a tube extending therefrom to the injector secondary passage. This container is preferably in the form of a cylinder. The apparatus may be used by itself, but it is preferable to provide a mixing tank in the liquid line beyond the outlet end of the injector.

Figure 1:
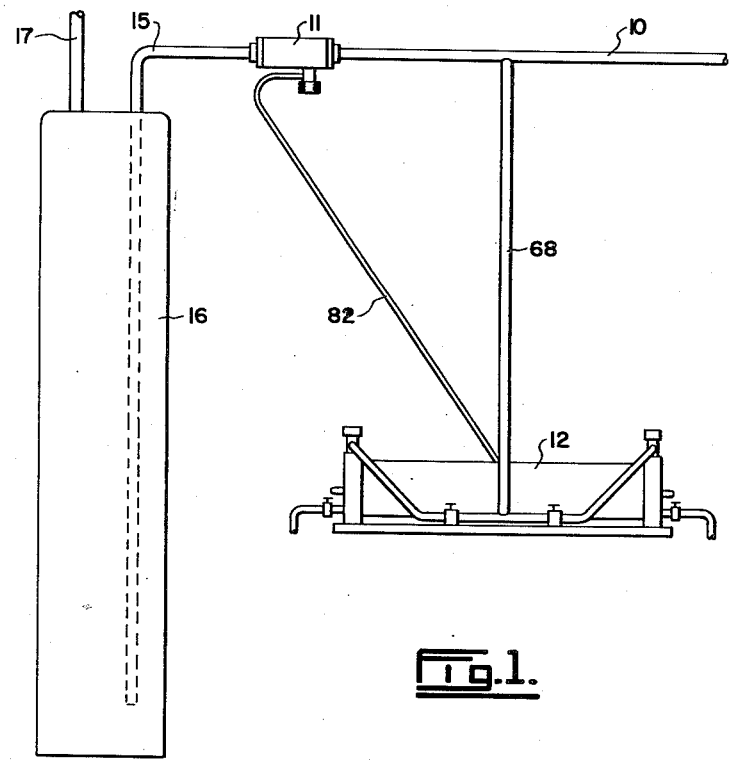
Figure 2:
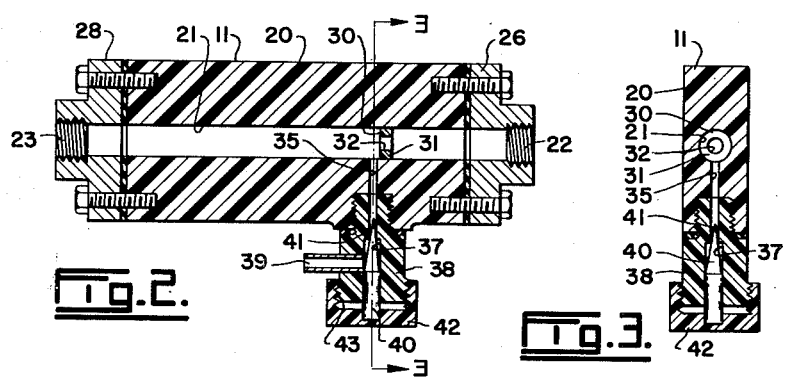
Figure 3:
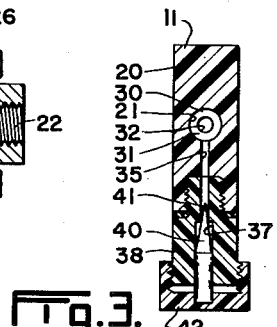
Figure 4:
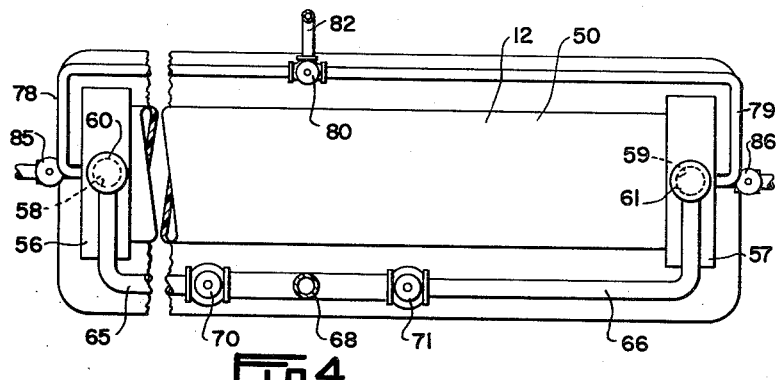
Figure 5:
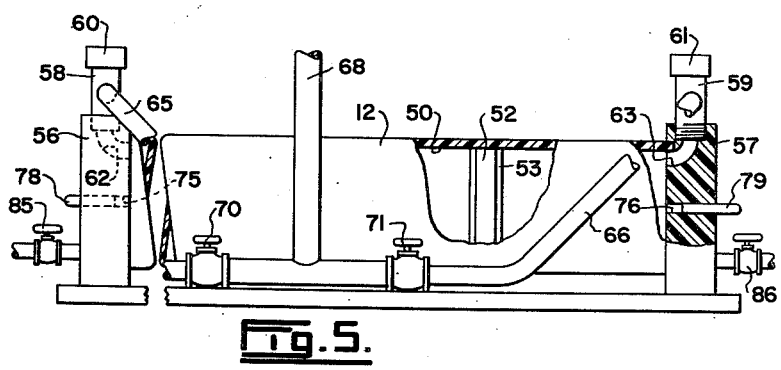
Figure 6:
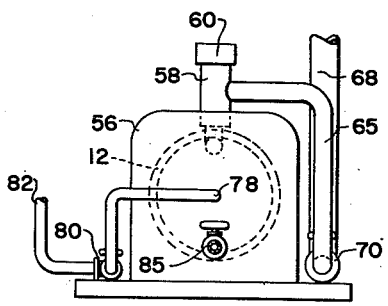

An example of this apparatus as applied to a water line is illustrated in the accompanying drawings, in which, Figure 1 is a diagrammatic view of the apparatus hooked up to a water line, Figure 2 is an enlarged longitudinal vertical section through the injector of the apparatus, Figure 3 is a vertical cross section taken on the line 3—3 of Figure 2, Figure 4 is an enlarged plan view of a cylinder container, Figure 5 is a side elevation of the cylinder, partly in section, and Figure 6 is an end elevation of the cylinder.

Referring to Figure 1 of the drawings, 10 is a water line or pipe extending from a suitable source, such as a street main, 11 is an injector connected to this pipe, and 12 is a cylinder container for the liquid solution to be directed by the injector into the water flowing through the line. The water may travel from the injector directly to the system with which this apparatus is used or, as preferred, a pipe 15 may extend from the injector into a mixing tank 16, said pipe terminating near the tank bottom. A pipe 17 extends from the top of the tank to the system.

Referring to Figures 2 and 3, the injector 11 consists of a body 20 having a primary or water passage 21 extending therethrough from an inlet 22 at one end to an outlet 23 at the opposite end. A suitable coupling 26 connects the pipe or line 10 to the inlet end of the injector body, while another coupling 28 connects the pipe 15 to the outlet end of said body. A restriction 30 is formed in the passage 21 spaced from the opposite ends thereof. This restriction may be formed in any convenient manner, such as, by a block 31 in the water passage having a relatively small orifice 32 therein.

A comparatively small secondary passage 35 is formed in the body 10 and communicates with the primary passage 21 at the restriction 30 on the side thereof facing the outlet 23. The passage 35 extends to an edge of the body 20 and communicates with or forms part of an enlarged passage 37 formed in a boss 38 projecting from said body side. A short tube 39 extends from the passage 37 outwardly from the side of the boss. A needle valve 40 is positioned in the passage 37 and has at one end a tip 41 projecting into the passage 35, and a knob 42 at its opposite end outside the boss. This knob is in the form of a cap threaded on the boss at 43. The knob may be turned to move the needle valve into or out of the secondary passage 35 to control the flow of liquid therethrough, said liquid entering through the tube 39.

As the solutions used with this type of apparatus are usually corrosive in nature, the elements forming the injector should be made of non-corrosive material. For example, the body 20, block 31, boss 38 and knob 42 may be formed of a suitable plastic material. The couplings 26 and 28 may be formed of aluminum alloy, while the valve tube 39 and valve 40 may be formed of a silver or other alloy.

The container 12 is preferably in the form of a cylinder 50 which is large enough to hold sufficient solution to be injected into the water line over a desirable period. This cylinder has a piston 52 slidably mounted therein, said piston being provided with one or more rings 53 formed of rubber or other suitable material. The illustrated cylinder and piston are set up for double operation, that is, for expelling solution therefrom when the piston is moved in either direction, but it is to be understood that it may be arranged to expel the solution when the piston moves in one direction only.

The cylinder 50 is closed at its opposite ends by end walls 56 and 57 having filling spouts 58 and 59 projecting upwardly therefrom, said spouts being normally closed by caps 60 and 61 respectively. The cylinder usually lies in a horizontal plane, and the spouts 58 and 59 communicate with the interior thereof near its top through passages 62 and 63 formed in the cylinder ends. Branch pipes 65 and 66 extend from the spouts 58 and 59 to a common pipe 68 which extends therefrom and is connected at its opposite end to the water line 10 beyond the inlet side of the injector 11, see Figure 1. Shut-off valves 70 and 71 are provided in the pipes 65 and 66.

Outlets 75 and 76 are formed in the end walls 56 and 57, and tubes 78 and 79 extend from these outlets to a directional valve 80. Another tube 82 extends from this valve to the tube 38 of the injector, see Figure 1. The valve 80 is such that it may be operated selectively to bring either tube 78 or 79 into communication with the common tube 82.

Drain cocks 85 and 86 are provided at opposite ends of the cylinder at the bottom thereof.

If desired, the cylinder 50 and piston 52 may be formed of the same non-corrosive material, such as a suitable plastic, as the body of the injector 11.

In order to set the apparatus up for operation, the desired liquid, such as a chlorine solution, is placed in the cylinder 50 with the piston 52 at one end of the latter. If it is desired to start with the piston at the end 57 of the cylinder, valve 71 may be closed and drain cock 86 opened. Water from the line 10 under the pressure of said line travelling along pipes 68 and 65 will enter the cylinder through the passage 62 to drive the piston towards the opposite end of the cylinder. When the valve 70 is closed, drain cock 85 may be opened and cap 60 removed to allow the water to escape from the cylinder. After cock 85 is closed, the solution is poured into the cylinder through the spout 58, after which cap 60 is replaced. Drain cock 86 is now closed, valve 71 opened, and the valve 80 turned to bring tube 78 into communication with tube 82, this action cutting the latter off from tube 79. The pressure of the water in the line is now applied to the opposite side of the piston 52, but the latter cannot move as long as there is no flow of water through the line 10 since the water pressure is also applied to the solution through the passage 35, tubes 82 and 78. If water is drawn from the system connected to pipe 17, water flows through pipe 10, and consequently, through the passage 21 of the injector 11. As the water flows through the primary passage, the restriction causes a pressure differential between the inlet side and outlet side thereof, the low pressure being on the outlet side where the liquid or secondary passage opens into the water passage. This destroys the balance so that solution is forced into the water as it flows through the passage 21. As soon as the withdrawal of water from the system ceases, the movement of solution stops since the pressure differential disappears and the equilibrium is immediately restored. Thus, movement of solution is instant when the water starts to move through the line and it ceases at exactly the same time as the water stops. The needle valve 40 is used to control the proportion of liquid to be added to the water.

When the piston 52 approaches the end 56, valve 71 may be closed and cock 86 opened to drain the cylinder between the piston and the end 57. Cap 61 should be removed at this time to permit air to enter the cylinder. After the cock is closed, this end of the cylinder may be filled with solution through spout 59, and the valve 80 turned to bring tube 79 into communication with tube 82. Cap 61 is replaced after this has been done. Following this, valve 70 is opened to apply the water pressure of line 10 to the piston and the solution between it and the injector.

This apparatus for injecting secondary liquid into a primary line containing a primary liquid operates due to the pressure differential in the injector set up by the primary liquid flowing through the restriction in the primary passage thereof. The high pressure on the inlet side of the restriction is transferred to the piston in the cylinder which, in turn, transfers it to the secondary liquid between the piston and the primary injector passage. As the secondary liquid extends to the lower pressure outlet side of the restriction, it flows into the primary liquid.

While the needle valve for controlling the flow of solution into the water has been described and illustrated at the injector, it is to be understood that this may be carried out by any metering device anywhere between the primary passage of the injector and the end or ends of the cylinder container. Furthermore, the directional valve 80 is not required if the solution is moved in one direction only by the piston in the cylinder.

As stated above, a mixing tank may or may not be used along with this apparatus. In the illustrated example, such a tank is preferred since the water with its solution is directed into the bottom of the tank and this provides a sufficient time lag for the solution to destroy any bacteria in the water. It also tends to average out any variations in the proportions of the two liquids.

What we claim as our invention is:

1. Apparatus for injecting liquid into a liquid-containing line, comprising a container cylinder, a floating piston in said cylinder, an inlet pressure pipe connected to one end of the cylinder, a shut-off valve in the inlet pipe, said cylinder holding a liquid therein on the opposite side of the piston from said pipe, an outlet pipe for said liquid extending from the end of the cylinder in said opposite side of the piston, a normally-closed filling opening in the cylinder between the piston and the outlet pipe, and normally-closed drain means at the end of the cylinder to which the inlet pipe is connected.

2. Apparatus for injecting liquid into a liquid-containing line, comprising a container cylinder, a floating piston in said cylinder, an inlet pressure branch pipe connected to each end of the cylinder, an inlet pressure pipe connected to both branch pipes, shut-off valves in said branch pipes, branch outlet pipes extending from each end of the cylinder, an outlet pipe extending from the outlet branch pipes, means for selectively bringing either outlet branch pipe into communication with the outlet pipe, and valve-controlled drain means at each end of the cylinder.

References Cited in the file of this patent

UNITED STATES PATENTS

| | | |
|---|---|---|
| 640,306 | Jones | Jan. 2, 1900 |
| 674,987 | Reilly | May 28, 1901 |
| 693,552 | Labadie | Feb. 18, 1902 |
| 704,244 | Davis | July 8, 1902 |
| 1,831,319 | Peet | Nov. 10, 1931 |
| 1,837,191 | Baldwin | Dec. 22, 1931 |
| 1,869,874 | Voorhees | Aug. 2, 1932 |
| 2,004,277 | Fink | June 11, 1935 |
| 2,033,427 | Guildford | Mar. 10, 1936 |
| 2,048,606 | Fuetterer | July 21, 1936 |
| 2,062,231 | Ornstein | Nov. 24, 1936 |
| 2,186,968 | Grau | Jan. 16, 1940 |
| 2,215,132 | Parker | Sept. 17, 1940 |
| 2,310,051 | Baer | Feb. 2, 1943 |
| 2,524,966 | Eisenman | Oct. 10, 1950 |
| 2,563,211 | Cassese | Aug. 7, 1951 |